United States Patent [19]

Anton

[11] Patent Number: 4,980,623
[45] Date of Patent: Dec. 25, 1990

[54] METHOD AND DEVICE FOR REDUCING TORQUE LOADING ON A SYSTEM DRIVEN BY AN ELECTRIC MOTOR

[75] Inventor: Rodi Anton, Leimen, Fed. Rep. of Germany

[73] Assignee: Heidelberger Druckmaschinen AG, Heidelberg, Fed. Rep. of Germany

[21] Appl. No.: 398,160

[22] Filed: Aug. 24, 1989

[30] Foreign Application Priority Data

Aug. 24, 1988 [DE] Fed. Rep. of Germany ....... 3828638

[51] Int. Cl.[5] .......................... H02P 7/00; F16F 15/10
[52] U.S. Cl. ..................................... 318/432; 318/437
[58] Field of Search ............... 318/432, 433, 437, 596, 318/609, 610; 388/805, 813, 820

[56] References Cited

U.S. PATENT DOCUMENTS

| | | | |
|---|---|---|---|
| 3,735,226 | 5/1973 | Pittney | 318/432 X |
| 4,019,107 | 4/1977 | Dixon et al. | 318/432 X |
| 4,156,162 | 5/1979 | Warfield et al. | 318/433 X |
| 4,163,927 | 8/1979 | Grice, Jr. | 318/432 X |
| 4,605,887 | 8/1986 | Boella et al. | 318/432 X |
| 4,618,805 | 10/1986 | Hornung | 318/432 X |

FOREIGN PATENT DOCUMENTS

| | | | |
|---|---|---|---|
| 53-140524 | 12/1978 | Japan | 318/432 |
| 58-95995 | 6/1983 | Japan | 318/432 |
| 58-175993 | 10/1983 | Japan | 318/432 |
| 58-198179 | 11/1983 | Japan | 318/432 |
| 61-04492 | 1/1986 | Japan | 318/433 |
| 61-258691 | 11/1986 | Japan | 318/432 |

*Primary Examiner*—Bentsu Ro
*Attorney, Agent, or Firm*—Herbert L. Lerner; Laurence A. Greenberg

[57] ABSTRACT

A method for reducing effects of torque fluctuations on a system driven by an electric motor and producing cyclically occurring, rotational speed-dependent load-torque fluctuations includes counteracting changes in load torque by effecting oppositely directed changes in drive torque so as to maintain the load torque at an approximately constant value.

4 Claims, 3 Drawing Sheets

METHOD AND DEVICE FOR REDUCING TORQUE LOADING ON A SYSTEM DRIVEN BY AN ELECTRIC MOTOR

BACKGROUND OF THE INVENTION

1. Field of the Invention

The invention relates to a method of reducing torque loading on a system driven by an electric motor and producing cyclically occurring, rotational speed-dependent load-torque fluctuations. Furthermore, the invention relates to a device for performing the method.

2. Description of the Related Art

A method is known from German Published Non-Prosecuted Application No. (DE-OS) 35 40 645 which has as its object the creation of a device which ensures the damping of torsional vibrations in a multi-mass torsional vibrator with an active system. Such torsional vibrations occur predominantly where fluctuations in torque are produced due to different load torques. These fluctuations in torque may excite vibrations, which will lead to very high dynamic loadings of the components in a system wherein several different masses are being moved.

Printing presses, in particular, have a multiplicity of devices which produce different load torques. Thus, for example, gripper controls via cam discs, sheet-feeding devices and sheet-transfer devices, as well as the printing forces themselves, produce cyclically recurring load torques, all of which act upon a central drive. This effect upon the central drive, which also serves to effect the angular coordination of the printing units in addition to the drive, causes elastic deformations in the power transmission means, for example, in the gear train, which likewise occur periodically in accordance with the fluctuations in load torque. The angular coordination and synchronization, respectively, of the individual printing units is thus disrupted, a fact which may become noticeable as register errors in the printed image.

According to the aforementioned heretofore-known method, torsional vibrations which are produced by such fluctuations in load torque are compensated for by torques acting in the opposite direction. Such oppositely directed torques are applied via a control or correcting element and act at a given location within the drive system. This method has a disadvantage, however, in that the counter-torques are produced at a single location in the drive system and thus do not counteract the load torques at the locations at which they are generated. Internal stresses which cannot be compensated for consequently occur within the drive train. These internal stresses within the drive do not reduce the loading on the transmission or gear train but may, under certain conditions, however, further increase that loading and may result in major deformations of the gear train. It is accordingly an object of the invention to provide a method of the foregoing general type which effectively reduces the fluctuations in load torque and which considerably decreases the loading on the drive.

SUMMARY OF THE INVENTION

With the foregoing and other objects in view, there is provided, in accordance with one aspect of the invention, a method for reducing effects of torque fluctuations on a system driven by an electric motor and producing cyclically occurring, rotational speed-dependent load-torque fluctuations, which comprises counteracting changes in load torque by effecting oppositely directed changes in drive torque so as to maintain the load torque at an approximately constant value.

In accordance with another aspect of the invention, there is provided a device for reducing effects of torque fluctuations on a system driven by an electric motor and including a rotational-speed regulating arrangement for producing cyclically occurring, rotational speed-dependent load-torque fluctuations, comprising means for regulating a mean value of the rotational speed of the electric motor to a substantially constant preselected value, means for detecting load torque, and means for regulating drive torque by changing the drive torque in a direction opposite to a direction of any change in the load torque so that the load torque is maintained at a substantially constant value.

In a system which is subject to load fluctuations and which is driven by a motor via a gear train, as mentioned hereinbefore, different, periodically changing forces occur at the sides of the teeth of the individual gears. These forces may lead to vibrations, as well as uneven running of the printing press with the negative consequences usually associated therewith.

An advantage of the invention is that the forces between the individual teeth are kept virtually constant. This means, therefore, that when a momentary increase occurs in the load torque, which would indicate an increased force between the sides of the teeth, a reduction in the drive torque takes place. The drive torque is, accordingly, briefly modulated with respect to the load torque and, in fact, to such an extent that the force between the sides of the teeth remains constant. If there is a reduction in the load torque, the drive torque increases, with the result that, in this case also, no load fluctuation occurs at the gear train.

The invention departs from the heretofore conventional method of drive control or regulation which, normally, whenever there was an increase in the load torque, also required an increase in the drive torque in order to keep the drive speed at a constant value. The inventive method according to the invention, however, is not in contradiction with the requirement for maintenance of a given rotational speed. Because a fluctuation in load torque always occurs only briefly and is repeated periodically, an increase in load torque thus being always followed again by a reduction in load torque, the mean rotational speed, which is measured over a very long period of time, remains constant. The invention thereby provides the advantage that the load torque acting upon the drive of the system is kept at a constant value. Thus, it is impossible for torsional vibrations and varying elastic deformations to occur at all. It is therefore not necessary to compensate for such vibrations.

In accordance with another feature of the invention, the device includes a memory for storing therein changes in the load torque as a function of a rotational-angle position of the system. The drive motor is then controlled or regulated based upon these variations in load torque. Storage in memory is performed either at the rated speed or, if rotational speed-dependent load torques occur due to vibrating systems, within specific rotational-speed ranges.

In accordance with a further feature of the invention, the device includes an angle transmitter, which may be constructed as an incremental sensor, for detecting the rotational-angle position of the system.

It has proven advantageous, when the drive or the entire system has large moments of inertia and when there is an increase in the load torque, not only to reduce the rotational speed, but also to effect active braking by the motor.

This braking is necessary if a reduction in rotational speed alone is no longer sufficient to counteract the load torque and to keep the load torque constant. Especially with regard to printing presses, the rotor of the drive motor has a very high moment of inertia, which counteracts a timely or prompt reduction in the drive torque. It may, therefore, be advantageous to brake the motor. Braking of the motor, however, has an effect on the motor only, because the drive system connected downline of the motor follows the deceleration due to the lower moments of inertia existing thereat, and the braking torque does not extend or spread to this region of the drive. This means, therefore, that there is no load variation and reversal in load direction, respectively, in a gear drive in this region of the drive.

In accordance with an additional feature of the invention, the means for regulating drive torque include a device for cyclically braking a rotor. The motor may also be capable of being braked so sharply and timely that the moment of inertia of the drive system connected downline does not contribute to any increase in the load torque.

In order to control or regulate the mean rotational speed, there is provided, in accordance with a concomitant feature of the invention, a rotational-speed transmitter for detecting an actual rotational speed of the system, a low-pass filter connected to the rotational-speed transmitter for receiving signals therefrom and for forming from the signals a mean value of the actual rotational speed and for superimposing the mean value on a nominal rotational-speed value, and means for feeding to the rotational speed-regulating arrangement a value representing a deviation between the mean value and the nominal value for regulating the mean value of the actual rotational speed to the nominal value of the rotational speed.

Other features which are considered as characteristic for the invention are set forth in the appended claims.

Although the invention is illustrated and described herein as embodied in a method and device for reducing torque loading on a system driven by an electric motor, it is nevertheless not intended to be limited to the details shown, since various modifications and structural changes may be made therein without departing from the spirit of the invention and within the scope and range of equivalents of the claims.

BRIEF DESCRIPTION OF THE DRAWING

The construction and method of operation of the invention, however, together with additional objects and advantages thereof will be best understood from the following description of specific embodiments when read in connection with the accompanying drawings, in which.

DESCRIPTION OF THE PREFERRED EMBODIMENT

Figure 1:
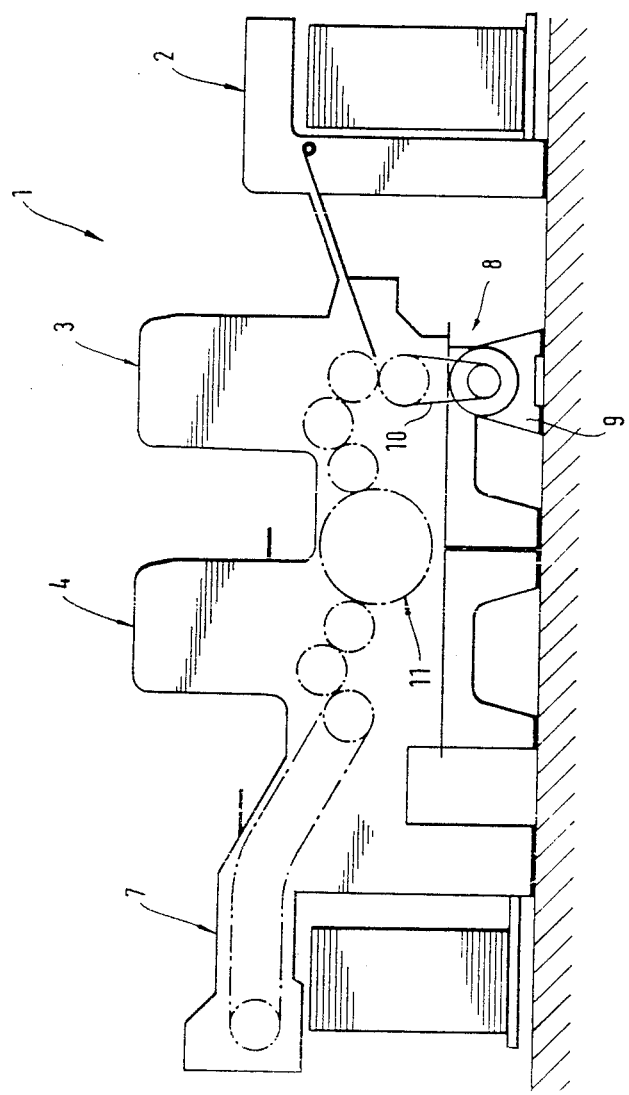
FIG. 1 is a diagrammatic side elevational view of a printing press.

Referring now to the figures of the drawing and, more particularly, to FIG. 1 thereof, there is shown diagrammatically therein a sheet-fed offset printing press 1 with a sheet feeder 2, two printing units 3 and 4 and a sheet delivery 7. Of course, the printing press 1 may have only one printing unit or even several printing units. A drive system 8 for the printing press 1 as a whole includes an electric motor 9, the drive torque of which is distributed via a belt drive 10 to a drive-gear train 11 and on to the respective elements which are to be driven. A printing press has cyclical fluctuations in load torque due to a multiplicity of cam-controlled moving elements, such as grippers, sheet feeders and distributor rollers, for example. These load torques act at different locations in the drive-gear train 11 and may cause elastic deformations in the driven parts. These elastic deformations effect, on the one hand, an excitation of vibrations of the entire system and, on the other hand, slight deviations between the angular positions of the individual printing units, so that, under certain circumstances, register errors may occur.

Normally, the rotational speed of the motor is set in accordance with a preselected printing speed and is kept constant by means of a control or regulating device. The control or regulation of the motor to a constant rotational speed, however, results in an increase in the drive torque when there is an increase in the load torque and, therewith, the forces acting on the drive-gear train likewise increase. In the same manner, a reduction in the load torque causes a reduction in the drive torque, due to which the forces in the drive-gear train 11 decrease. These cyclical fluctuations in the load torque, which result both in greater wear of the driven components as well as greater inaccuracy of the printed image in the form of a register error, are thereby markedly reduced so that the drive motor is not controlled or regulated to a constant rotational speed, but is controlled or regulated so as to attain a constant load torque.

Figure 2:
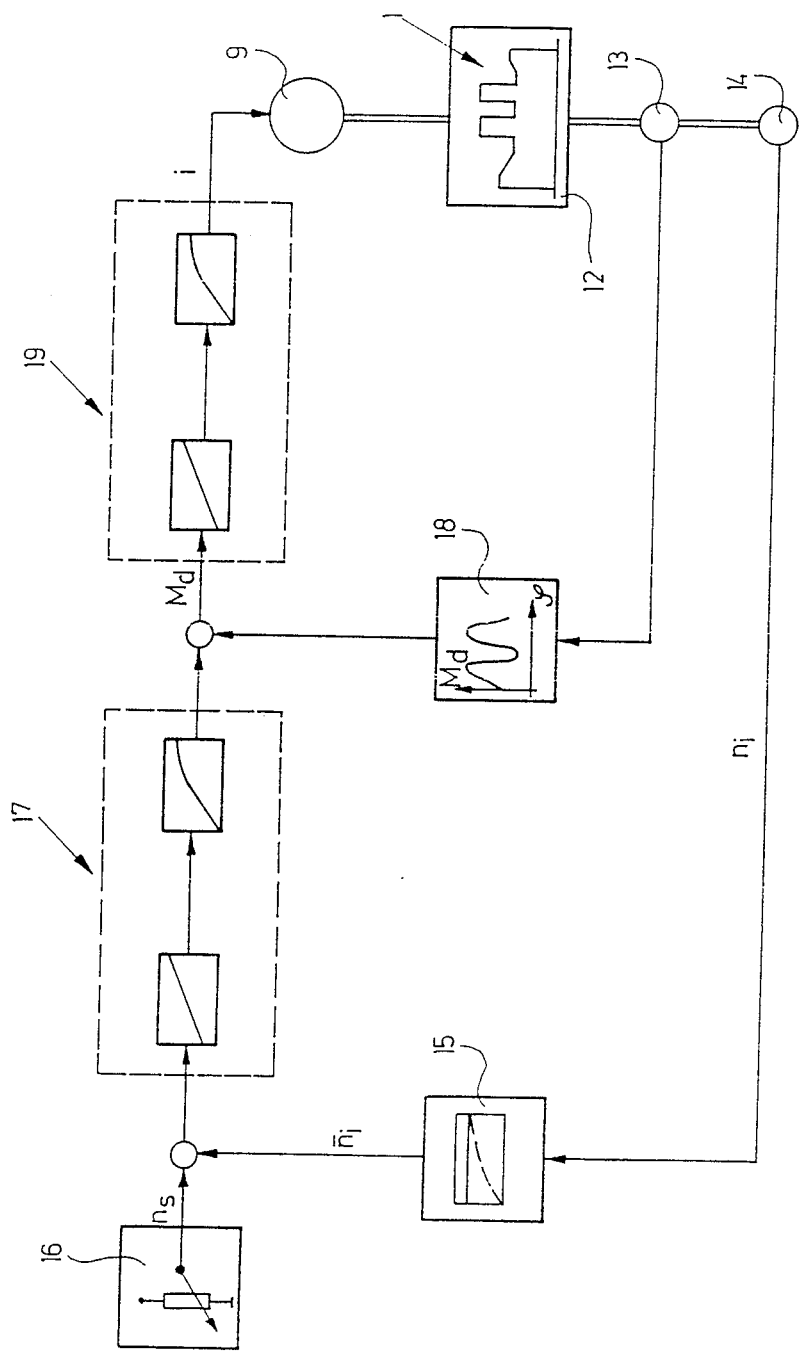
FIG. 2 is a block diagram of a drive-torque regulating system.

FIG. 2 is a block diagram of such a control or regulating system. The main component of this block diagram is the drive motor 9 for driving the printing press 1, which is represented diagrammatically in block 12. An angle sensor or transmitter 13 and a rotational-speed sensor or transmitter 14 are disposed on the printing press 1. The sensors 13 and 14 detect the rotational speed and the printing speed, respectively. It is, of course, also possible to employ a single rotational-speed sensor, from the signal shape of which both the angle of rotation as well as the rotational speed may be derived, such as, from an incremental transmitter, for example.

A signal $n_i$ from the rotational-speed sensor 14 is fed to a low-pass filter (symbolically represented in box 15), which forms a means value $\bar{n}_i$ from this signal $n_i$. The mean value $\bar{n}_i$ is superimposed on a rotational-speed setpoint or nominal value $n_s$, which is formed by a printing-speed input device (symbolically represented by a simple voltage transmitter in the form of a potentiometer 16 with which a given voltage value is set as a nominal or setpoint rotational-speed value $n_s$). The superimposed signal i.e. the difference signal which is thus formed by the superimposition, is fed to a rotational-speed control or regulator 17 which, upon the occurrence of a deviation between the mean value of the actual rotational-speed value and the setpoint or nominal rotational-speed value, generates via a torque control or regulator 19 an output signal correspondingly influencing the rotational speed of the drive motor 9. The mean value of the rotational speed is thereby held constant independently of deviations or fluctuations in the drive torque. As shown in FIG. 2, the rotational-speed control 17 is made up of two symbolically-illustrated control components, the first of which represents a proportional control unit and the second, an integral control unit. The torque control 19, like the rotational-speed control 17, is formed of a proportional control unit and an integral control unit as shown symbolically in FIG. 2.

The angular-position signal of the printing press formed by the angle transmitter 13 is fed to a memory device 18. The distribution of the load torque of the printing press relative to the angular position of the drive is stored in the memory device 18. Advantageously, the load torque of angular positions between 0 degrees and 360 degrees is stored, this angular range corresponding to the passage of a printed sheet through a printing unit. The storage of the load torque may, for example, be effected in a trial run; it is also possible to effect the storage within given rotational-speed ranges. This is especially advantageous if the printing press is operated at varying rotational speeds and if, at these varying rotational speeds, there are variations in the load torques due to accelerated masses.

The load torque to be stored may, however, also be measured and stored anew by load-torque pickups each time the printing press is started up. In this manner, the load torque to be stored can be adapted to the varying operating modes of the printing press, such as first form and perfector printing, printing of a specific number of colors, and printing of different paper thicknesses.

In synchronism with the angular position of the printing press, which is detected by the angle transmitter 13, the stored load torque is outputted by the memory device 18. This load torque output is impressed on the output signal of the rotational-speed regulator 17 and is fed as a drive-torque input to a torque control or regulator 19 which controls or regulates the drive torque via the motor current. The motor current, which, as the output signal from the torque control or regulator 19, controls or regulates the drive motor 9, thus contains, because of its means value, a measure of the mean rotational speed and, because of its cyclical adaptation to the stored load torque, a variation in the drive torque. Two independently operating control loops thus act upon the motor, the inner control loop varying the drive torque as a function of the load torque, and the outer control loop adjusting the mean rotational speed of the motor as a function of the nominal or setpoint rotational-speed value.

Figure 3A:
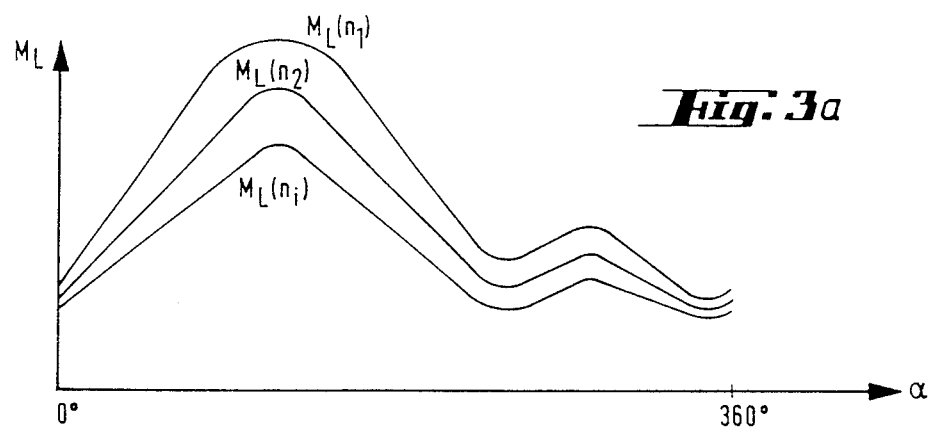
FIGS. 3a, 3b and 3c are plot diagrams representing the relationship between drive torques and load torques, respectively, and rotational speed.
Figure 3B:
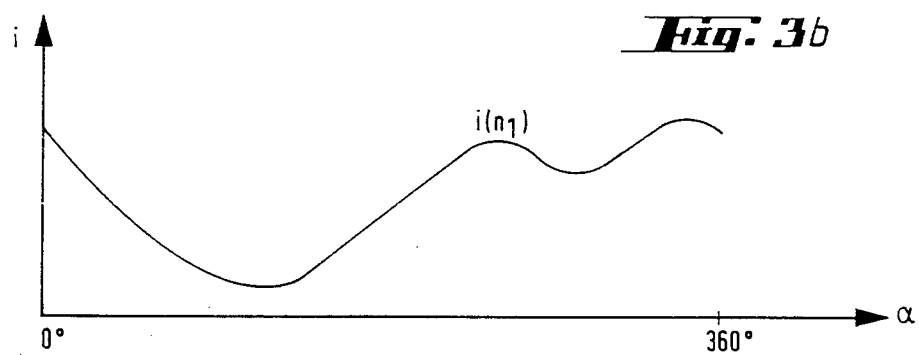
Figure 3C:
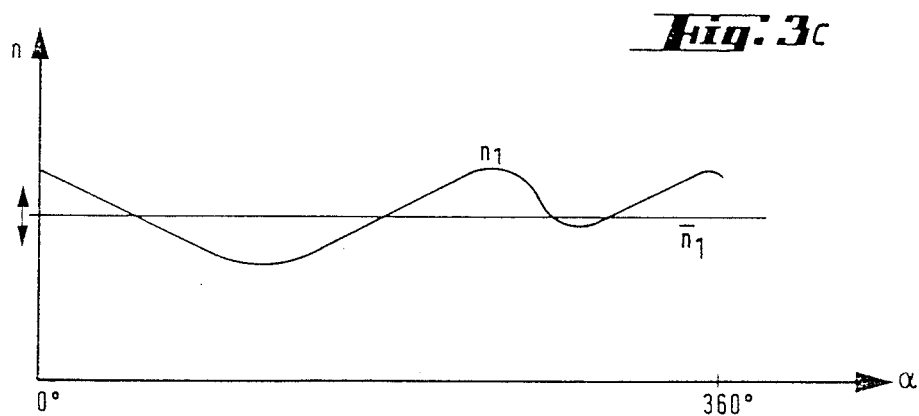

FIGS. 3a, 3b and 3c are plot diagrams showing the relationships between the different torques and the rotational speed. The plot diagram of FIG. 3a represents the load-torque distribution across an angular-position range from 0 degrees to 360 degrees. This distribution is repeated cyclically for each revolution of the press. The load-torque distribution $M_L$ is represented for a specific rotational speed ($n_1$). This diagram also shows that the load torque may be stored at different rotational speeds. Load torques $M_L(n_i)$ which are assigned to the respective rotational speeds and which are impressed upon the drive-torque control during the operation of the printing press are produced depending upon the existing rotational speed of the printing press. The plot diagram 3b represents the motor current i, which is produced by the torque control 19, as a function of the stored load torque. It is apparent that the current is inversely proportional to the stored load torque. The diagram shows the current which is obtained at the rotational speed $n_1$. Based upon these variations in current and the load torque acting on the motor, the rotational speed $n_1$ of the motor will result in accordance with the plot diagram of FIG. 3c.

Due to the dependence of the load torque on the rotational speed, the reduction in rotational speed results in a decrease of the load torque. The magnitude of the change in the rotational speed is such that the load torque formed by the press remains approximately constant. A correlation between motor rotational speed and load torque occurs so that the decrease and increase, respectively, of the rotational speed has a direct effect upon the load torque and, in fact, to such an extent that the fluctuations in load torque are effectively reduced and a mean load torque is obtained which is approximately constant. The plot diagram of FIG. 3c further shows the mean rotational speed $\bar{n}_1$. This mean rotational speed corresponds to the nominal or setpoint rotational-speed value and is constant.

It becomes apparent that the afore-described process for reducing the torque loading i.e. for keeping the load torque constant, has no effect upon the production process. The mean press speed, therefore, does not undergo any changes but may be preselected in accordance with demands.

I claim:

1. Device for reducing effects of torque fluctuations on a system driven by an electric motor, comprising a rotational-speed regulating arrangement for producing cyclically occurring, rotational speed-dependent load-torque fluctuations, said arrangement having means operatively connected to the electric motor for regulating a mean value of the rotational speed of the electric motor to a substantially constant preselected value, means operatively connected to the electric motor for detecting load torque, a memory connected to said load-torque detecting means for storing therein changes in the load torque as a function of a rotational-angle position of the system, and means operatively connected to the electric motor and to said load-torque detecting means for regulating drive torque by changing the drive torque in a direction opposite to a direction of any change in the load torque so that the load torque is maintained at a substantially constant value.

2. Device according to claim 1, wherein said means for detecting load torque comprises an angle transmitter for detecting the rotational-angle position of the system.

3. Device according to claim 1, wherein said means for regulating drive torque include a device for cyclically braking a rotor of the electric motor.

4. Device according to claim 1, including a rotational-speed transmitter for detecting an actual rotational speed of the system, a low-pass filter connected to said rotational-speed transmitter for receiving signals therefrom and for forming from said signals said mean value of the actual speed, and means for feeding to said rotational speed-regulating arrangement a value representing a deviation between the mean value and a nominal rotational-speed value for superimposing said mean value on the nominal rotational-speed value for regulating the mean value of the actual rotational speed to the nominal value of the rotational speed.

* * * * *